Patented June 15, 1937

2,084,262

UNITED STATES PATENT OFFICE 2,084,262

PRODUCTS BONDED WITH THE RESINOUS REACTION PRODUCTS FROM POLYHYDRIC ALCOHOLS AND BORIC ACID COMPOUNDS

Willis A. Boughton, Cambridge, and William R. Mansfield, Boston, Mass., assignors to New England Mica Co., Waltham, Mass., a corporation of Massachusetts No Drawing. Original application September 28, 1934, Serial No. 746,016. Divided and this application April 9, 1935, Serial No. 15,422

12 Claims. (Cl. 154—2.6)

This invention relates to products composed of discrete particles, useful in the arts, said particles being bonded with resin-like and wax-like compounds made from polyhydric alcohols and certain boric acid compounds. This application is a division from our co-pending application for Resinous and wax-like reaction products from polyhydric alcohols and boric acid compounds, Serial Number 746,016, filed September 28, 1934; and also takes the place of co-pending application Serial Number 661,864, filed March 20, 1933, by W. A. Boughton.

An object of the invention is to provide products made of discrete particles of matter bonded together with a new type of binder, the products being capable of withstanding wide temperature changes, ranging from ordinary temperatures to those approaching a red heat, without loss of integration or impairment of other useful properties.

A further object is to provide laminated mica products, for example sheets, bound with a new type of colloidal binder possessing the advantages of the well known low-temperature organic binders and also the high temperature inorganic binders, the products maintaining continuous integration over wide ranges of temperature, from ordinary temperatures up to that of thermal disintegration of the mica.

A further object is to provide laminated mica products having new and useful properties over increased temperature ranges, which new properties result from the employment of new types of colloidal organic-inorganic compounds as binders, as described herein.

A further object is to provide laminated mica products, which when in the form of sheets, may originally possess flexibility at ordinary temperatures, and after heating retain to a large degree their bonded strength, even when heated to the decomposition temperature of mica, but which after having been heated to high temperatures lose their original flexibility upon cooling to ordinary temperatures, becoming rigid when cooled, in any desired formed shape.

A further object is to provide a mica product, for example a sheet, which at normal temperatures shall have a dielectric strength sufficient for all commercial purposes, and at higher temperatures shall possess minima of dielectric strength sufficient for all commercial purposes and also retain its integration and good mechanical properties after cooling.

A further object is to provide a laminated mica product, for example a sheet, that maintains integration and high dielectric strength at all temperatures under all conditions of service up to the point of decomposition of the mica.

Other objects of the invention will be apparent to those skilled in the art upon reading the specification.

As heretofore disclosed in the following—
Boughton, Patent 1,975,078; Oct. 2, 1934;
Boughton, Patent 1,975,079; Oct. 2, 1934;
Boughton and Mansfield, Patent 1,975,080; Oct. 2, 1934;
Boughton Patent, No. 2,004,030, June 4, 1935—
salts of mono- (or meta) boric acid are of great value in the compounding of inorganic adhesives, particularly in the manufacture of laminated mica products, because of the colloidal, viscous, nature of their aqueous solutions, and the glass-like condition of their fused forms.

In a search for new and advantageous binders for mica pieces or scales in the manufacture of laminated mica products, it has been discovered that resinous adhesives formed by reaction of boric acid radical compounds with aliphatic polyhydric alcohols (see copending application Serial Number 661,864, above noted) are good binders and produce manufactured articles of novel and useful properties. Chief among these properties is their resistance to heat applied during use. These will be discussed later in greater detail.

Many varieties of the common laminated mica plate of commerce, being bonded with an organic adhesive, show excellent desired properties such as electrical resistance and mechanical strength in temperature ranges below about 300° C. But at higher temperatures the binder is subject to thermal decomposition causing delamination and destruction of the mica article.

More recently a new and important series of inorganic adhesives for mica has been developed (see Dawes and Boughton Patents, 1,578,812; 1,578,813; Boughton Patents, 1,975,078; 1,975,079; and others) by means of which mica products have been made having superior properties especially in the higher temperature ranges, up to the decomposition temperature of mica itself. At lower temperatures the water present in the patented compositions, necessarily combined colloidally with the inorganic substance (by means of which an adhesive molecular structure is obtained) may prevent the attainment of a desirable degree of electrical resistance and also in some instances may even cause undesired and undue hygroscopicity.

It is essential to the present invention to state that one important class of these inorganic adhesives included the monoboric acid radical compounds, such as for example, sodium monoborate.

The experiments on the new resinous materials prepared by reaction of boric acid radical compounds with a polyhydric alcohol were inaugurated in the hope of discovering reaction products that would prove to have the good properties of an organic mica binder at the lower temperatures, and at higher temperatures at which any organic material would necessarily be subject to thermal destruction, the inorganic boric acid radical part of the molecules would then function to act as the binder, and maintain integration of the mica product through the maximum temperature ranges at which mica itself can be employed.

The results obtained showed that this actually was the case, and that mica articles bonded with the new resinous adhesives showed the required properties over the entire temperature range from normal to approximately the decomposition temperature of mica itself.

The new adhesive is applied preferably in solution, such as in alcohol. The solid or its solution may, however, be used according to any standard method known in the art. Subsequently the green plate of desired thickness is rolled, pressed, heated under the usual pressure and finished just as in the known processes of making mica plate with organic binder. The products closely resemble those obtained when organic binders are used. They do not change below about 300° C., when made at this temperature. Above about 300° C.–350° C., the inorganic portion of the molecule takes up the whole burden of bonding.

Regarding the binders themselves, it has been found that by fully reacting various boric acid compounds with polyhydric alcohols such as glycerol and ethylene glycol, resinous products are formed which not only incorporate the properties of the wholly inorganic boric acid compounds in solution, but at higher temperatures continue to be adhesive and have novel and valuable thermal and electrical properties throughout a wide range of temperatures. Such products are wax-like or hard semi-glass-like resinous masses. Because of the unusual mechanical and chemical difficulty of analyzing such materials, no proof of their exact chemical nature can be offered at this time, but they are believed to be the ester-like derivatives of the boric acid compounds, produced by successive dehydration of the ortho- and pyro- forms, according in one variety, to the following changes—

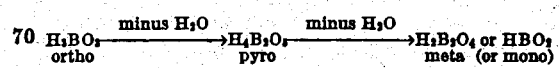

$$H_3BO_3 \xrightarrow{\text{minus } H_2O} H_4B_2O_5 \xrightarrow{\text{minus } H_2O} H_2B_2O_4 \text{ or } HBO_2$$
ortho — pyro — meta (or mono)

It is believed that all of the boric acid compounds reacted as described below enter into the above scheme in one stage or another to form, finally, the monoboric acid compound. In other words, when the reaction takes place at all, the eventual product is the monoboric acid compound.

The orthoboric acid compounds show practically none of the resinous adhesive properties sought. The pyroboric acid compounds are thinly viscous or somewhat waxy. The monoboric acid compounds on the other hand show resinous or waxy properties to a high degree.

The characteristics of the reaction products and the conditions of the reaction employed are dependent on (1) the particular inorganic compound used, (2) the polyhydric alcohol used, (3) the proportions employed, and (4) the temperature.

In general, the reaction takes place in three recognizable stages, as follows: (1) At temperatures below 100° C. the boric acid compound dissolves in the polyhydric alcohol to its maximum solubility, probably to form the orthoborate. (2) From 100° C. to 140° C., water of composition and reaction is evolved and the excess of boric acid compound dissolves in part to form wax-like products; or if no excess is present, the mass becomes increasingly viscous. Such compounds are probably pyroborates. From 140° C. to 180° C. or 200° C. viscosity increases, and complete solution takes place with evolution of considerable water. The products are usually hard resins and are probably the monoborates. They are soluble in both water and alcohol, and are somewhat hygroscopic in moist air. Their bonding properties are excellent. At ordinary temperatures the bond is hard to flexible. After having been heated to 180° C.–315° C., a harder stiff bond is formed. Above about 300° C.–350° C. the organic part of the molecule is charred. Fusion of the inorganic residue to form a glassy adhesive bond takes place below 650° C. During the entire range of temperature such materials have the property of bonding laminated mica products, and other temperature-resisting materials.

In addition to the products obtained from single polyhydric alcohols, useful products of this type are also obtained with mixtures of polyhydric alcohols; for example, mixtures of glycerol and ethylene glycol, in any proportion, with single or mixed boric acid compounds, may be used in any of the examples described herein.

Details of the preparations and properties of various products now follow—

TABLE 1

Products of reaction between 100 g. of glycerol and various amounts of orthoboric acid

| Boric acid, grams | At 100° C. | At 120° C. | At 160° C.–180° C. |
|---|---|---|---|
| 25 | Clear water white viscous. | Unchanged | Unchanged. |
| 50 | Opaque viscous liquid. | Clear water white viscous liquid. | Clear yellowish plastic. |
| 75 | Opaque waxy fluid. | Opaque waxy semi-fluid. | Clear highly viscous yellowish resinous. |
| 100 | | White waxy plastic. | Clear yellowish hard resin. |
| 150 | | ----do---- | Do. |
| 200 | | Hard white wax-like body. | Opaque hard resin. |
| 250 | | ----do---- | Do. |

Obviously the optimum proportions for the hard, bonding resin sought are 75–150 grams of boric acid to 100 grams of glycerol, and the temperature specifications 160° C.–180° C.

TABLE 2

Summary of optimum conditions for reaction of boric acid compound with 100 g. of glycerol

| Boric acid compound | Grams | Temperature centigrade °C. | Description of product |
|---|---|---|---|
| Boric acid | 100-150 | 160-180 | Clear to slightly opaque hard resins. |
| Borax | 100 | 130-160 | Do |
| Boric anhydride | 100 | 160-180 | Slightly opaque, yellow-brown, hard resins. |
| Ammonium borate | 100 | 180-200 | Slightly to heavily opaque, hard resins. |
| Magnesium borate | 100 | 180-200 | Greenish yellow, clear to creamy, hard resins. |
| Manganese borate | 100 | 160-180 | Brown, hard resins |
| Potassium borate | 100 | 140 | Clear to cloudy, white resins. |
| | 100 | 180 | Clear, yellowish, hard resins. |
| Sodium monoborate | 100 | 140-160 | Clear, yellowish soft to firm resins. |
| | 100 | 160 | Opaque, hard resin. |
| Sodium perborate | 100 | 140 | Clear, dark brown, hard resin. |
| *Using 100 g. of ethylene glycol instead of glycerol* | | | |
| Boric acid | 200 | 160-200 | Cloudy hard resins. |
| Borax | 100 | 200 | Clear hard resins. |

Experiments with heavy metal borates failed to show formation of analogous resinous compounds.

These resin-like compounds, either alone or in combination with other adhesives, form highly efficient bonding agents for a great variety of materials, including mica flakes, sheets or layers of various materials, mineral and vegetable fibrous matter, and many kinds of powdered materials.

We claim—

1. As an article of manufacture, a pressed, laminated, mica product containing mica flakes permanently bonded together with the colloidal viscous resinous reaction product of at least one polyhydric alcohol and at least one boric acid compound.

2. As an article of manufacture, a pressed, laminated, mica product containing mica flakes permanently bonded together with the colloidal viscous resinous reaction product of at least one polyhydric alcohol and an alkali metal monoborate.

3. As an article of manufacture, a pressed, laminated, mica product containing mica flakes permanently bonded together with the colloidal viscous resinous reaction product of at least one polyhydric alcohol and sodium monoborate.

4. As an article of manufacture, a pressed, laminated, mica product containing mica flakes permanently bonded together with the colloidal viscous resinous reaction product of a mixture of polyhydric alcohols and sodium monoborate.

5. As an article of manufacture, a pressed, laminated, mica product containing mica flakes permanently bonded together with the colloidal viscous resinous reaction product of glycerol and at least one boric acid compound.

6. As an article of manufacture, a pressed, laminated, mica product containing mica flakes permanently bonded together with the colloidal viscous resinous reaction product of glycerol and a monoboric acid compound.

7. As an article of manufacture, a pressed, laminated, mica product containing mica flakes permanently bonded together with the colloidal viscous resinous reaction product of glycerol and an alkali metal borate.

8. As an article of manufacture, a pressed, laminated, mica product containing mica flakes permanently bonded together with the colloidal viscous resinous reaction product of glycerol and sodium monoborate.

9. As an article of manufacture, a pressed, laminated, mica product containing mica flakes permanently bonded together with the colloidal viscous resinous reaction product of ethylene glycol and a boric acid compound.

10. As an article of manufacture, a pressed, laminated, mica product containing mica flakes permanently bonded together with the colloidal viscous resinous reaction product of ethylene glycol and an alkali metal borate.

11. As an article of manufacture, a pressed, laminated, mica product containing mica flakes permanently bonded together with the colloidal viscous resinous reaction product of ethylene glycol and sodium monoborate.

12. As an article of manufacture, a pressed, laminated, mica product containing mica flakes permanently bonded together with the mono-acid-radical reaction product of a polyhydric alcohol and a boric-acid-radical compound, said mica product remaining bonded and possessing high electrical resistance over a temperature range from ordinary temperatures to upwards of 650° C. and higher.

WILLIAM R. MANSFIELD.
WILLIS A. BOUGHTON.